(12) United States Patent
Loh et al.

(10) Patent No.: US 10,662,737 B2
(45) Date of Patent: May 26, 2020

(54) FLUID INJECTION VALVE

(71) Applicants: Yuh Loh, Cypress, TX (US); Do Seo Park, Houston, TX (US)

(72) Inventors: Yuh Loh, Cypress, TX (US); Do Seo Park, Houston, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 0 days.

(21) Appl. No.: 16/043,655

(22) Filed: Jul. 24, 2018

(65) Prior Publication Data

US 2020/0032917 A1 Jan. 30, 2020

(51) Int. Cl.
*E21B 34/08* (2006.01)
*E21B 34/10* (2006.01)
*E21B 34/16* (2006.01)
*E21B 34/14* (2006.01)
*F16K 31/08* (2006.01)
*F16K 15/04* (2006.01)
(Continued)

(52) U.S. Cl.
CPC ............ *E21B 34/08* (2013.01); *E21B 34/10* (2013.01); *E21B 34/101* (2013.01); *E21B 34/102* (2013.01); *E21B 34/14* (2013.01); *E21B 34/16* (2013.01); *E21B 41/02* (2013.01); *F16K 15/044* (2013.01); *F16K 31/084* (2013.01); *E21B 43/12* (2013.01); *Y10T 137/7925* (2015.04)

(58) Field of Classification Search
CPC .... E21B 34/00; E21B 2034/002; E21B 34/06; E21B 34/08; E21B 34/10; E21B 34/101; E21B 34/102; E21B 34/14; E21B 34/16; E21B 41/02; E21B 43/12; F16K 15/04; F16K 15/044; F16K 15/18; F16K 15/183; F16K 17/0406; F16K 31/1221; F16K 31/02; F16K 31/06; F16K 31/08; F16K 31/084; Y10T 137/7927; Y10T 137/7928

See application file for complete search history.

(56) References Cited

U.S. PATENT DOCUMENTS 2,939,475 A * 6/1960 Roach ................... F16K 15/042
137/155
3,225,783 A * 12/1965 Stacha ................... E21B 43/123
137/155

(Continued)

FOREIGN PATENT DOCUMENTS

WO WO-9857082 A1 * 12/1998 ........... F16K 15/021
WO WO-2007024894 A2 * 3/2007 ........... F16K 31/084

*Primary Examiner* — Reinaldo Sanchez-Medina
*Assistant Examiner* — David Colon-Morales
(74) *Attorney, Agent, or Firm* — Cantor Colburn LLP

(57) ABSTRACT

A fluid injection valve comprising: a valve body including a first end having a first opening, a second end having a second opening, an outer surface and an inner surface defining a fluid pathway extending between the first end and the second end; a seat arranged along the fluid pathway; a restriction device selectively abutting the seat; a biasing member arranged in the fluid pathway abutting the restriction device; urging the restriction device against the seat; a biasing element having a biasing force urging the biasing member against the restriction device; and a magnet functionally connected to the biasing element, the magnet selectively forcing the biasing member axially outwardly of the restriction device against the biasing force.

14 Claims, 3 Drawing Sheets

(51) Int. Cl.
*E21B 41/02* (2006.01)
*E21B 43/12* (2006.01)

(56) References Cited

U.S. PATENT DOCUMENTS

| | | | | |
|---|---|---|---|---|
| 5,320,136 A * | 6/1994 | Morris | ................. | F16K 15/021 |
| | | | | 137/516.29 |
| 6,622,752 B2 * | 9/2003 | Kushida | .............. | F16K 17/0406 |
| | | | | 137/536 |
| 6,675,823 B2 * | 1/2004 | Guo | ........................ | F04C 14/26 |
| | | | | 137/115.04 |
| 6,880,639 B2 * | 4/2005 | Rhodes | ................... | E21B 34/08 |
| | | | | 166/321 |
| 6,953,054 B2 * | 10/2005 | Oba | ...................... | F16K 15/044 |
| | | | | 137/539.5 |
| 7,311,118 B2 * | 12/2007 | Doutt | .................... | F16K 15/044 |
| | | | | 137/15.18 |
| 7,604,063 B2 * | 10/2009 | Mashburn | ............... | E21B 21/10 |
| | | | | 137/513.7 |
| 8,365,753 B2 * | 2/2013 | Dana | ...................... | F16K 31/084 |
| | | | | 137/12 |
| 8,763,706 B2 * | 7/2014 | Lembcke | ............. | E21B 43/123 |
| | | | | 166/325 |
| 9,145,888 B2 * | 9/2015 | Hoshino | ............. | F04B 11/0091 |
| 2001/0032675 A1 * | 10/2001 | Russell | ................... | F16K 17/18 |
| | | | | 137/493.9 |
| 2005/0061372 A1 * | 3/2005 | McGrath | ............. | F02M 69/465 |
| | | | | 137/539.5 |
| 2013/0180592 A1 * | 7/2013 | He | ........................ | F16K 15/063 |
| | | | | 137/1 |
| 2014/0182855 A1 * | 7/2014 | Woodford | ............... | E21B 34/08 |
| | | | | 166/305.1 |
| 2015/0323088 A1 * | 11/2015 | Zuercher | ............... | F16K 17/164 |
| | | | | 137/528 |
| 2016/0145983 A1 * | 5/2016 | Salihbegovic | ........ | E21B 43/123 |
| | | | | 137/12 |
| 2016/0290099 A1 * | 10/2016 | Balasubramanian | ... | F03G 7/065 |
| 2017/0306732 A1 * | 10/2017 | Beveridge | ............. | E21B 43/128 |
| 2018/0363416 A1 * | 12/2018 | Park | ......................... | E21B 34/08 |
| 2019/0072187 A1 * | 3/2019 | Park | ......................... | F16K 1/42 |

* cited by examiner

FLUID INJECTION VALVE

BACKGROUND

In the resource exploration and recovery industry, various fluids may be introduced into tools, formations, and/or formation fluids for various purposes. In some cases, injection devices are employed to introduce the fluid. Injection devices may include a piston that is urged against a restriction device such as a check ball resting on a seat. The check ball is held against the seat by a spring. Fluid is directed at the piston at a pressure sufficient to overcome a spring force thereby unseating the check ball to expose an orifice. Such an arrangement is typically referred to as a floating piston valve.

Floating piston valve possess several drawbacks. Developing a constant flow rate at various pressures is challenging given the need to overcome the spring force. Further, piston tolerances, seat tolerances and spring force often lead to delays in closing off fluid flow. Delays in valve closing result in costly injection fluid losses. Additionally, floating piston style valves are prone to wear and corrosion. Accordingly, the industry would be receptive of an alternative to a floating piston valve.

SUMMARY

A fluid injection valve comprising: a valve body including a first end having a first opening, a second end having a second opening, an outer surface and an inner surface defining a fluid pathway extending between the first end and the second end; a seat arranged along the fluid pathway; a restriction device selectively abutting the seat; a biasing member arranged in the fluid pathway abutting the restriction device; urging the restriction device against the seat; a biasing element having a biasing force urging the biasing member against the restriction device; and a magnet functionally connected to the biasing element, the magnet selectively forcing the biasing member axially outwardly of the restriction device against the biasing force.

A resource exploration and recovery system comprising: a first system defining a surface system; a second system defining a sub-surface system, the second system including a tubular string; a fluid injection valve supported by the tubular string and operatively connected with the first system the fluid injection valve comprising: a valve body including a first end having a first opening, a second end having a second opening, an outer surface and an inner surface defining a fluid pathway extending between the first end and the second end; a seat arranged along the fluid pathway; a restriction device selectively abutting the seat; a biasing member arranged in the fluid pathway abutting the restriction device; urging the restriction device against the seat; a biasing element having a biasing force urging the biasing member against the restriction device; and a magnet functionally connected to the biasing element, the magnet selectively forcing the biasing member axially outwardly of the restriction device against the biasing force.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
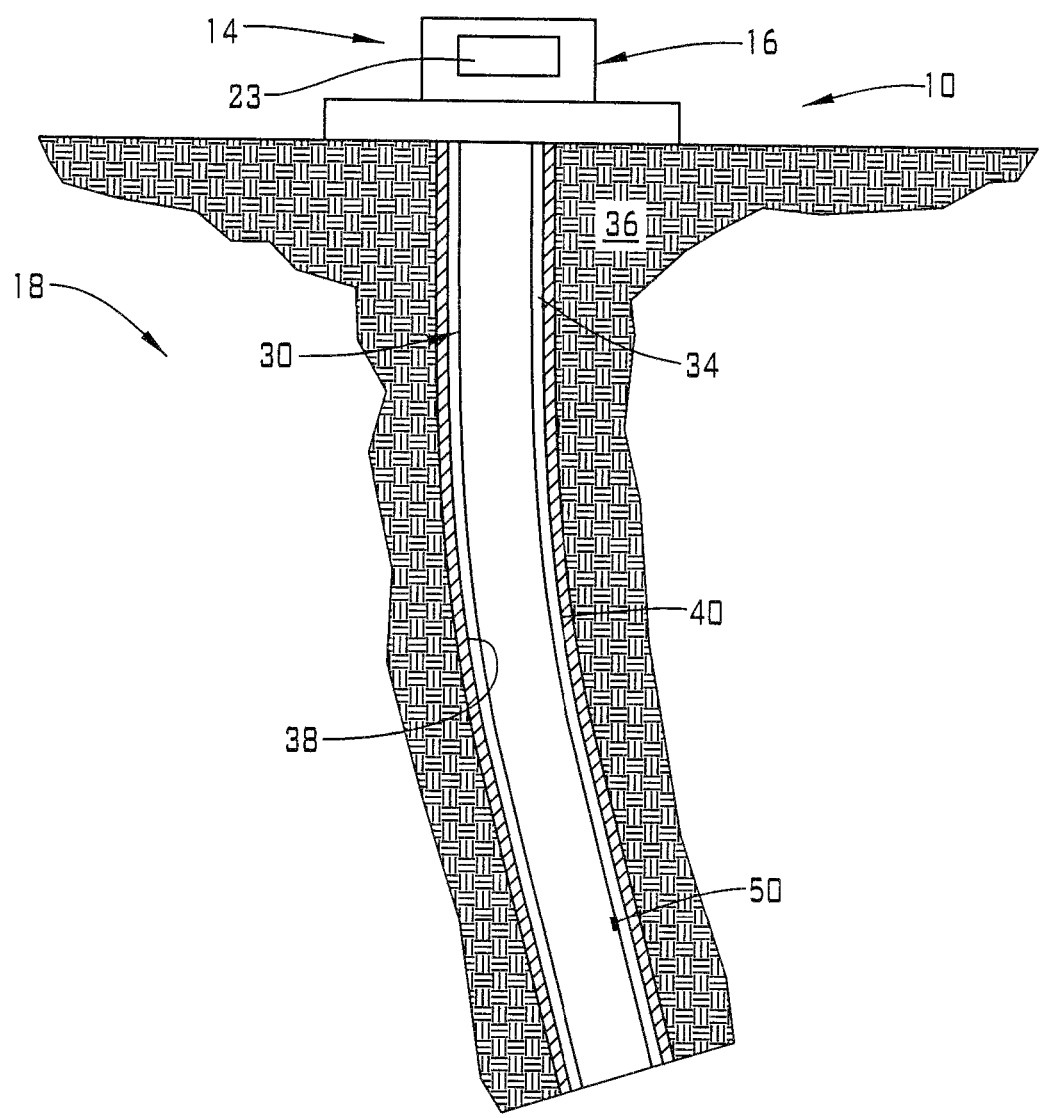
FIG. 1 depicts a resource exploration and recovery system including a fluid injection valve, in accordance with an exemplary embodiment.

A resource exploration and recovery system, in accordance with an exemplary embodiment, is indicated generally at 10, in FIG. 1. Resource exploration and recovery system 10 should be understood to include well drilling operations, completions, resource extraction and recovery, $CO_2$ sequestration, and the like. Resource exploration and recovery system 10 may include a first system 14 which, in some environments, may take the form of a surface system 16 operatively and fluidically connected to a second system 18 which, in some environments, may take the form of a subsurface system.

First system 14 may include a control system 23 that may provide power to, monitor, communicate with, and/or activate one or more downhole operations as will be discussed herein. Surface system 16 may include additional systems such as pumps, fluid storage systems, cranes and the like (not shown). Second system 18 may include a tubular string 30 that extends into a wellbore 34 formed in a formation 36. Tubular string 30 may be formed by a series of interconnected discrete tubulars or by a single tubular that could take the form of coiled tubing. Wellbore 34 includes an annular wall 38 which may be defined by a surface of formation 36, or, in the embodiment shown, by a casing tubular 40. It should be understood that wellbore 34 may also include an open hole configuration.

Figure 2:
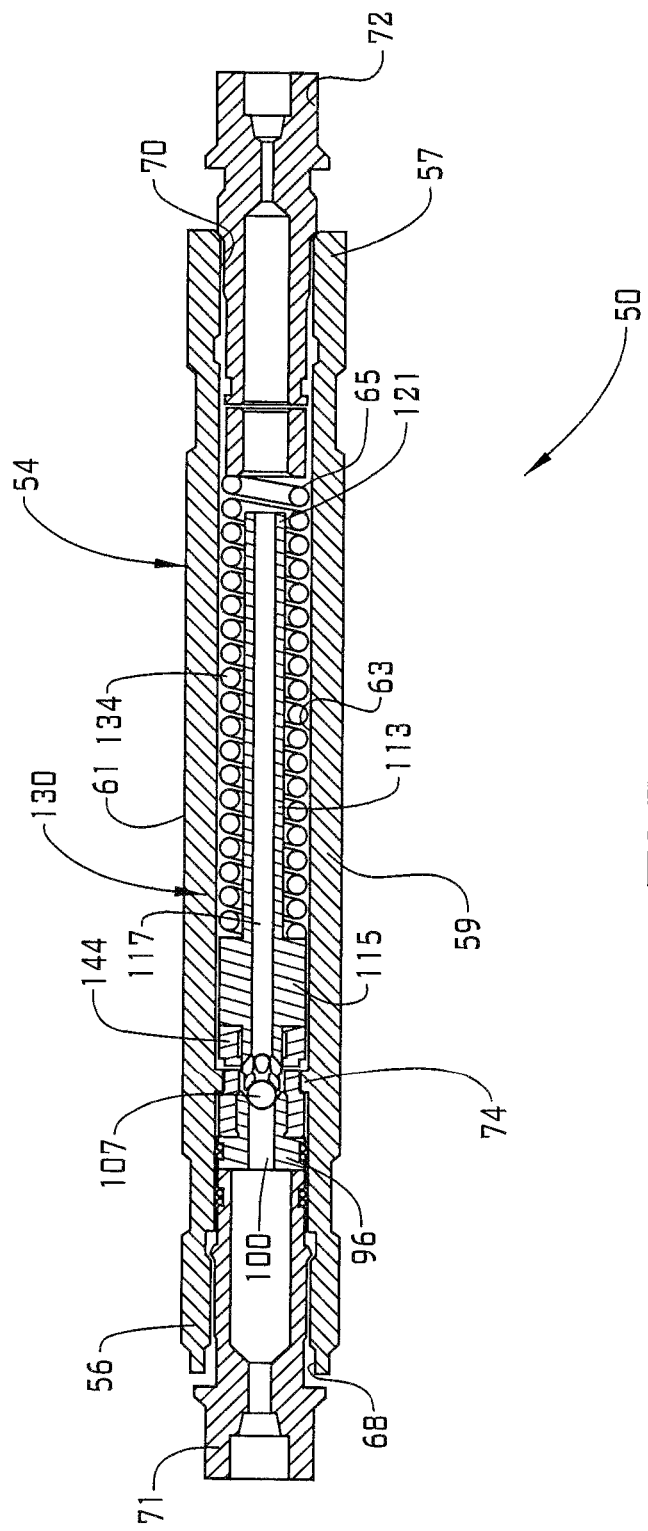
FIG. 2 depicts a cross-sectional side view of the fluid injection valve, in accordance with an aspect of an exemplary embodiment.
Figure 3:
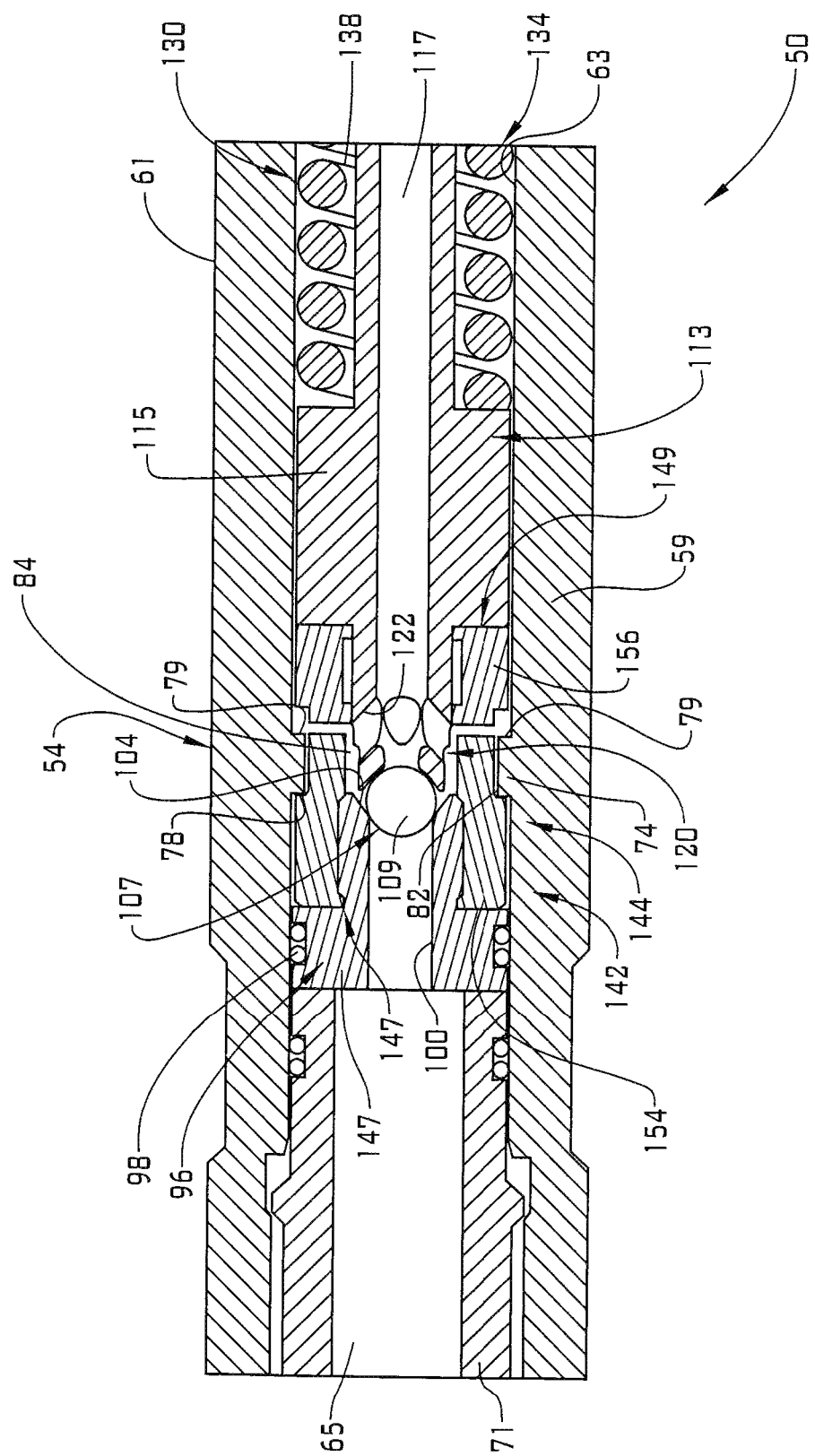
FIG. 3 depicts a portion of the fluid injection valve of FIG. 2, in accordance with an aspect of an exemplary embodiment.

In accordance with an exemplary embodiment shown in FIGS. 2 and 3, a fluid injection valve 50 is supported by tubular string 30. Fluid injection valve 50 includes a valve body 54 having a first end 56, a second end 57 and an intermediate portion 59 extending therebetween. Intermediate portion 59 defines an outer surface 61 and an inner surface 63 of valve body 54. Inner surface 63 defines a fluid pathway 65 that extends between first end 56 and second end 57.

First end 56 defines a first opening or inlet 68 and second end 57 defines a second opening or outlet 70. A first connector 71 is arranged at first end 56 and a second connector 72 is arranged at second end 57. First connector 71 may define a fluid delivery connector and second connector 72 may define a fluid discharge connector. A projection 74 may extend radially inwardly from inner surface 63. Projection 74 includes a first side 78 and an opposing second side 79. An opening 82 extends through projection 74 defining a fluid passage 84. Projection 74 may extend annularly about inner surface 63 thereby defining an annular projection (not separately labeled).

In accordance with an exemplary aspect, a seat 96 is positioned in fluid passage 84 proximate to first side 78 of projection 74. A seal 98 may extend about seat 96 and engage with inner surface 63. Seat 96 includes a passage 100 that is fluidically connected with fluid passage 84. Passage 100 is shown to include a tapered edge 104 that is receptive of a restriction device 107 that may take the form of a plug, a dart, or the like and may operate to impede fluid flow through opening 82. In the embodiment shown, the restriction device takes the form of a check ball 109.

In further accordance with an exemplary aspect, a biasing member 113 selectively acts upon restriction device 107. Biasing member 113 may take the form of a dart 115 that urges restriction device 107 onto seat 96. Biasing member 113 includes a central conduit 117 that is fluidically connected with fluid passage 84. Biasing member 113 also includes a first end section 120 that abuts restriction device 107 and a second end section 121. First end section 120 includes a plurality of openings 122 that may be receptive to fluid passing through fluid passage 84 when restriction device 107 is able to move off of seat 96.

A biasing element 130 acts upon biasing member 113 thereby urging restriction device 107 onto seat 96. Biasing element 130 may take the form of a spring 134 having a plurality of coils 138 that wrap about biasing member 113. Thus, in an exemplary aspect, biasing element 130 takes the form of a coil spring. Of course, biasing element 130 may take on a variety of forms. Biasing element 130 is designed to impart a selected force to biasing member 113. The selected force may be overcome by a selected fluid pressure introduced into first end 56. More specifically, fluid, at a selected pressure, may act upon and unseat restriction device 107_against biasing element 130. In this manner, an amount of fluid may pass from second end 57.

In still further accordance with an exemplary embodiment, fluid injection valve 50 includes a closing mechanism 142 that promotes quick closure of restriction device 107. Closing mechanism 142 includes a magnet 144 that acts upon biasing member 113. Magnet 144 forces biasing element 113 against restriction device. In an embodiment, magnet 144 includes a first magnet portion 147 and a second magnet portion 149.

First magnet portion 147 may take the form of a positive magnet pole 154 arranged between first side 78 of projection 74 and seat 96. Second magnet portion 149 may take the form of a negative magnet pole 156 arranged at second side 79 of projection 74 and extends about first end section 120. First and second magnet portions 147 and 149 may take the form of rare earth magnets. However, it should be understood, that magnet 144 may take on a variety of forms including a selectively controllable electro magnet. Fluid, at or above the selected pressure, may act upon and unseat restriction device 107 against biasing element 130 and magnet 144. When fluid pressure drops below the selected level, both magnet 144 and biasing element 130 force biasing member 113 to urge restriction device 107 against seat 96. Magnet 144 provides increased response speed thereby ensuring that minimal fluid leaves fluid injection device 50 once the fluid pressure drops below the selected level.

At this point, it should be understood that the exemplary embodiments provide an injector for introducing a selected amount of fluid into a subterranean system. By using both a magnet and a spring to close the injector, greater control may be had over the selected amount of fluid that is introduced into the subterranean system. Further, the magnet allows for the use of a spring having less force than is required in conventional injectors. In addition, the use of the magnet and spring, in combination, also allows the injector to have a shorter axial length than conventional injectors due, in part, to the use of a softer spring.

Set forth below are some embodiments of the foregoing disclosure:

Embodiment 1

A fluid injection valve comprising: a valve body including a first end having a first opening, a second end having a second opening, an outer surface and an inner surface defining a fluid pathway extending between the first end and the second end; a seat arranged along the fluid pathway; a restriction device selectively abutting the seat; a biasing member arranged in the fluid pathway abutting the restriction device; urging the restriction device against the seat; a biasing element having a biasing force urging the biasing member against the restriction device; and a magnet functionally connected to the biasing element, the magnet selectively forcing the biasing member axially outwardly of the restriction device against the biasing force.

Embodiment 2

The fluid injection valve according to any prior embodiment, wherein the biasing member includes a first opening arranged at the restriction device and conduit extending toward the second end, the conduit including a second opening.

Embodiment 3

The fluid injection valve according to any prior embodiment, wherein the biasing element comprises a coil spring extending about the biasing member.

Embodiment 4

The fluid injection valve according to any prior embodiment, further comprising: a projection extending radially inwardly from the inner surface, the projection defining a fluid passage.

Embodiment 5

The fluid injection valve according to any prior embodiment, wherein the seat is arranged on a first side of the projection.

Embodiment 6

The fluid injection valve according to any prior embodiment, wherein the biasing member and the biasing element are arranged on a second, opposing side of the projection.

Embodiment 7

The fluid injection valve according to any prior embodiment, wherein the magnet is arranged at the projection.

Embodiment 8

The fluid injection valve according to any prior embodiment, wherein the magnet includes a first magnet portion arranged on the first side of the projection and a second magnet portion arranged on the second side of the projection.

Embodiment 9

The fluid injection valve according to any prior embodiment, wherein the first magnet portion is arranged between the seat and the first side of the projection.

Embodiment 10

The fluid injection valve according to any prior embodiment, wherein the projection comprises an annular projection.

Embodiment 11

The fluid injection valve according to any prior embodiment, wherein the magnet comprises a rare earth magnet.

Embodiment 12

A resource exploration and recovery system comprising: a first system defining a surface system; a second system defining a sub-surface system, the second system including a tubular string; a fluid injection valve supported by the tubular string and operatively connected with the first system the fluid injection valve comprising: a valve body including a first end having a first opening, a second end having a second opening, an outer surface and an inner surface defining a fluid pathway extending between the first end and the second end; a seat arranged along the fluid pathway; a restriction device selectively abutting the seat; a biasing member arranged in the fluid pathway abutting the restriction device; urging the restriction device against the seat; a biasing element having a biasing force urging the biasing member against the restriction device; and a magnet functionally connected to the biasing element, the magnet selectively forcing the biasing member axially outwardly of the restriction device against the biasing force.

Embodiment 13

The resource exploration and recovery system according to any prior embodiment, further comprising: a projection extending radially inwardly from the inner surface, the projection defining a fluid passage.

Embodiment 14

The resource exploration and recovery system according to any prior embodiment, wherein the seat is arranged on a first side of the projection.

Embodiment 15

The resource exploration and recovery system according to any prior embodiment, wherein the biasing member and the biasing element are arranged on a second, opposing side of the projection.

Embodiment 16

The resource exploration and recovery system according to any prior embodiment, wherein the magnet is arranged at the projection.

Embodiment 17

The resource exploration and recovery system according to any prior embodiment, wherein the magnet includes a first magnet portion arranged on the first side of the projection and a second magnet portion arranged on the second side of the projection.

Embodiment 18

The resource exploration and recovery system according to any prior embodiment, wherein the first magnet portion is arranged between the seat and the first side of the projection.

Embodiment 19

The resource exploration and recovery system according to any prior embodiment, wherein the projection comprises an annular projection.

Embodiment 20

The resource exploration and recovery system according to any prior embodiment, wherein the magnet comprises a rare earth magnet.

The use of the terms "a" and "an" and "the" and similar referents in the context of describing the invention (especially in the context of the following claims) are to be construed to cover both the singular and the plural, unless otherwise indicated herein or clearly contradicted by context. Further, it should be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A fluid injection valve comprising:
   a valve body including a first end having a first opening, a second end having a second opening, an outer surface and an inner surface having a radially inwardly directed projection defining a fluid pathway extending between the first end and the second end;

a seat arranged along the fluid pathway;

a restriction device selectively abutting the seat;

a biasing member arranged in the fluid pathway abutting the restriction device;

a biasing element having a biasing force urging the biasing member against the restriction device; and a first magnet portion arranged in the valve body between the seat and the projection and a second magnet portion mounted to the biasing member, the first magnet portion extending over the projection, the first and second magnet portions functionally connected to the biasing element and selectively forcing the biasing member against of the restriction device.

2. The fluid injection valve according to claim 1, wherein the biasing member includes a first end including a first opening arranged at the restriction device a second end, and a conduit extending from the first end toward the second end, the second end including a second opening.

3. The fluid injection valve according to claim 1, wherein the biasing element comprises a coil spring extending about the biasing member.

4. The fluid injection valve according to claim 1, wherein the seat is arranged on a first side of the projection.

5. The fluid injection valve according to claim 4, wherein the biasing member and the biasing element are arranged on a second, opposing side of the projection.

6. The fluid injection valve according to claim 5, wherein the magnet is arranged at the projection.

7. The fluid injection valve according to claim 1, wherein the projection comprises an annular projection.

8. The fluid injection valve according to claim 1, wherein the magnet comprises a rare earth magnet.

9. A resource exploration and recovery system comprising:

a first system defining a surface system;

a second system defining a sub-surface system, the second system including a tubular string;

a fluid injection valve supported by the tubular string and operatively connected with the first system the fluid injection valve comprising:

a valve body including a first end having a first opening, a second end having a second opening, an outer surface and an inner surface having a radially inwardly directed projection defining a fluid pathway extending between the first end and the second end;

a seat arranged along the fluid pathway;

a restriction device selectively abutting the seat;

a biasing member arranged in the fluid pathway abutting the restriction device;

a biasing element having a biasing force urging the biasing member against the restriction device; and a first magnet portion arranged in the valve body between the seat and the projection and a second magnet portion mounted to the biasing member, the first magnet portion extending over the projection, the first and second magnet portions functionally connected to the biasing element and selectively forcing the biasing member against of the restriction device.

10. The resource exploration and recovery system according to claim 9, wherein the seat is arranged on a first side of the projection.

11. The resource exploration and recovery system according to claim 10, wherein the biasing member and the biasing element are arranged on a second, opposing side of the projection.

12. The resource exploration and recovery system according to claim 11, wherein the magnet is arranged at the projection.

13. The resource exploration and recovery system according to claim 9, wherein the projection comprises an annular projection.

14. The resource exploration and recovery system according to claim 9, wherein the magnet comprises a rare earth magnet.

* * * * *